US008958599B1

(12) United States Patent
Starner

(10) Patent No.: US 8,958,599 B1
(45) Date of Patent: Feb. 17, 2015

(54) INPUT METHOD AND SYSTEM BASED ON AMBIENT GLINTS

(71) Applicant: Google Inc., Mountain View, CA (US)

(72) Inventor: Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 13/647,333

(22) Filed: Oct. 8, 2012

Related U.S. Application Data

(60) Provisional application No. 61/584,176, filed on Jan. 6, 2012, provisional application No. 61/584,099, filed on Jan. 6, 2012.

(51) Int. Cl.
*G06K 9/00* (2006.01)
(52) U.S. Cl.
USPC ........... 382/103; 382/107; 382/173; 382/117; 382/170; 382/171
(58) Field of Classification Search
CPC .............. G02B 27/017; G02B 27/225; G02B 27/0172; G02B 27/0176; G02B 2027/0132; A61B 3/08; A61B 3/063; A61B 3/113; H04N 13/0402; H04N 13/0404; G09F 19/00; G09F 27/00
USPC ................. 382/103, 107, 117, 170, 171, 173; 348/77, 78, 169, 172; 351/205, 210, 351/206, 209; 235/411; 250/203.1
See application file for complete search history.

(56) References Cited

U.S. PATENT DOCUMENTS

| 6,120,461 | A | 9/2000 | Smyth |
| 7,391,887 | B2 | 6/2008 | Durnell |
| 7,963,652 | B2 | 6/2011 | Vertegaal et al. |
| 2002/0067466 | A1* | 6/2002 | Covannon et al. ................ 353/8 |
| 2003/0214710 | A1* | 11/2003 | Takahashi et al. ............. 359/443 |
| 2005/0052617 | A1* | 3/2005 | Fujikawa et al. ............... 353/10 |
| 2005/0099601 | A1* | 5/2005 | MacDougall et al. ........ 351/209 |
| 2011/0182472 | A1 | 7/2011 | Hansen |

* cited by examiner

*Primary Examiner* — Ali Bayat
(74) *Attorney, Agent, or Firm* — McDonnell Boehnen Hulbert & Berghoff LLP

(57) ABSTRACT

A method may involve analyzing eye-image data to determine observed movement of a reflected image over a predetermined period, using head-movement data to determine a first eye-movement component corresponding to head movement during the predetermined period, determining a first expected movement of the reflected image corresponding to the first eye-movement component, determining a second eye-movement component based on a difference between the observed movement and the first expected movement, determining a second expected movement of the reflected image based on the combination of the first eye-movement component and the second eye-movement component, determining a difference between the observed movement and the second expected movement, if the difference is less than a threshold, setting eye-movement data for the predetermined period based on the second eye-movement component; and if the difference is greater than the threshold, adjusting the first eye-movement component and repeating the method with the adjusted first eye-movement component.

20 Claims, 12 Drawing Sheets

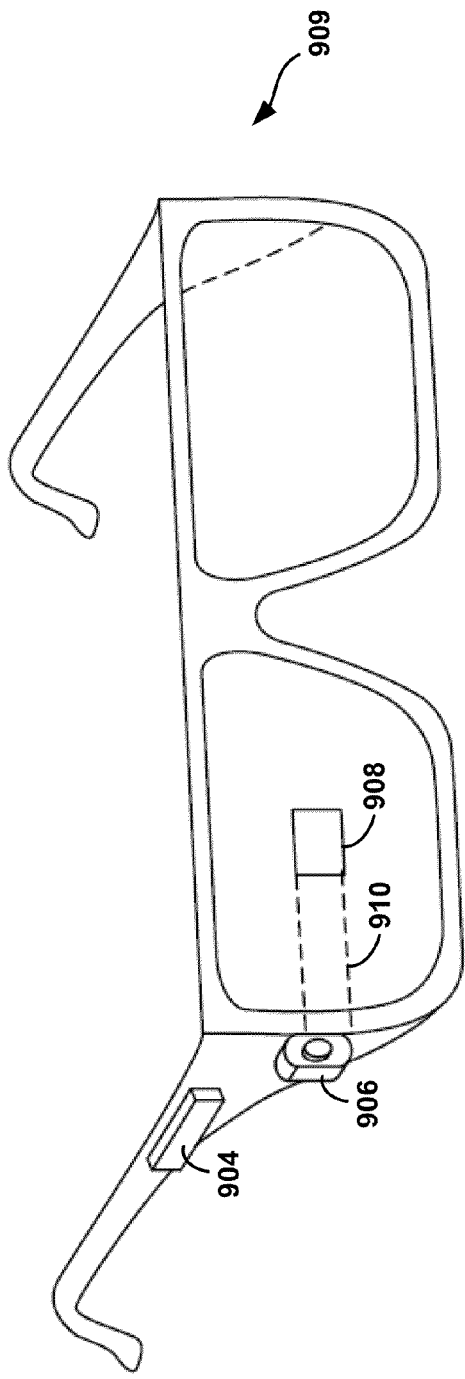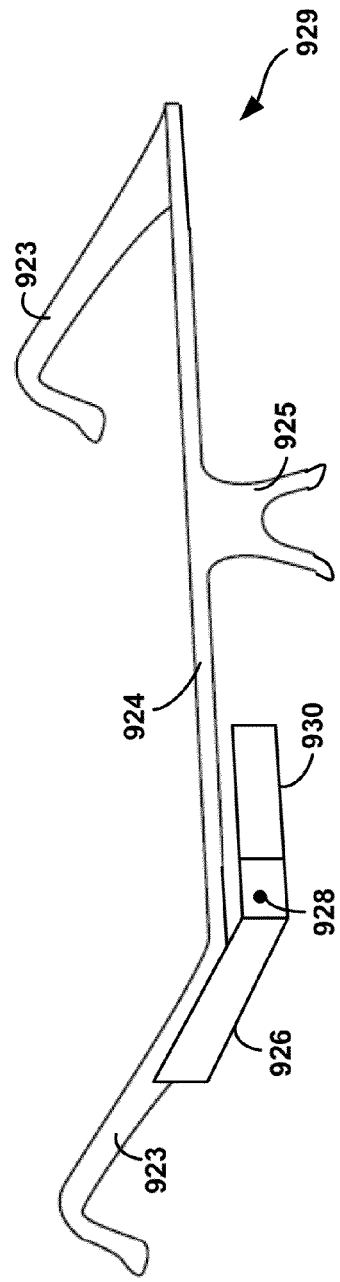
FIG. 9C
FIG. 9D

INPUT METHOD AND SYSTEM BASED ON AMBIENT GLINTS

CROSS REFERENCE TO RELATED APPLICATIONS

This patent application claims priority to U.S. Application No. 61/584,176, filed Jan. 6, 2012, and to U.S. Application No. 61/584,099, filed Jan. 6, 2012, the contents of which are entirely incorporated herein by reference, as if fully set forth in this application.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary computer-implemented method may involve: (a) analyzing eye-image data to determine observed movement of a reflected image over a predetermined period, wherein the reflected image is reflected from an eye; (b) using head-movement data to determine a first eye-movement component that corresponds to head movement during the predetermined period; (c) determining a first expected movement of the reflected image, wherein the first expected movement corresponds to the first eye-movement component; (d) determining a second eye-movement component based on a first difference between the observed movement of the reflected image and the first expected movement of the reflected image; (e) determining a second expected movement of the reflected image based on the combination of the first eye-movement component and the second eye-movement component; (f) determining a second difference between the observed movement of the reflected image on the corneal surface and the second expected movement of the reflected image; (g) if the second difference is less than a threshold difference, then setting eye-movement data for the predetermined period based on the second eye-movement component; and (h) if the second difference is greater than the threshold difference, then: (i) adjusting the first eye-movement component based on the second difference; and (ii) repeating (d) to (g) with the adjusted first eye-movement component.

In another aspect, an exemplary system may include a non-transitory computer-readable medium and program instructions stored on the non-transitory computer-readable medium. The program instructions are executable by at least one processor to: (a) analyze eye-image data to determine observed movement of a reflected image over a predetermined period, wherein the reflected image is reflected from an eye; (b) use head-movement data to determine a first eye-movement component that corresponds to head movement during the predetermined period; (c) determine a first expected movement of the reflected image, wherein the first expected movement corresponds to the first eye-movement component; (d) determine a second eye-movement component based on a first difference between the observed movement of the reflected image and the first expected movement of the reflected image; (e) determine a second expected movement of the reflected image based on the combination of the first eye-movement component and the second eye-movement component; (f) determine a second difference between the observed movement of the reflected image on the corneal surface and the second expected movement of the reflected image; (g) if the second difference is less than a threshold difference, then set eye-movement data for the predetermined period based on the second eye-movement component; and (h) if the second difference is greater than the threshold difference, then: (i) adjust the first eye-movement component based on the second difference; and (ii) repeat (d) to (g) with the adjusted first eye-movement component.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 9C illustrates another wearable computing system, according to an exemplary embodiment.

FIG. 9D illustrates another wearable computing system, according to an exemplary embodiment.

DETAILED DESCRIPTION

Figure 1:
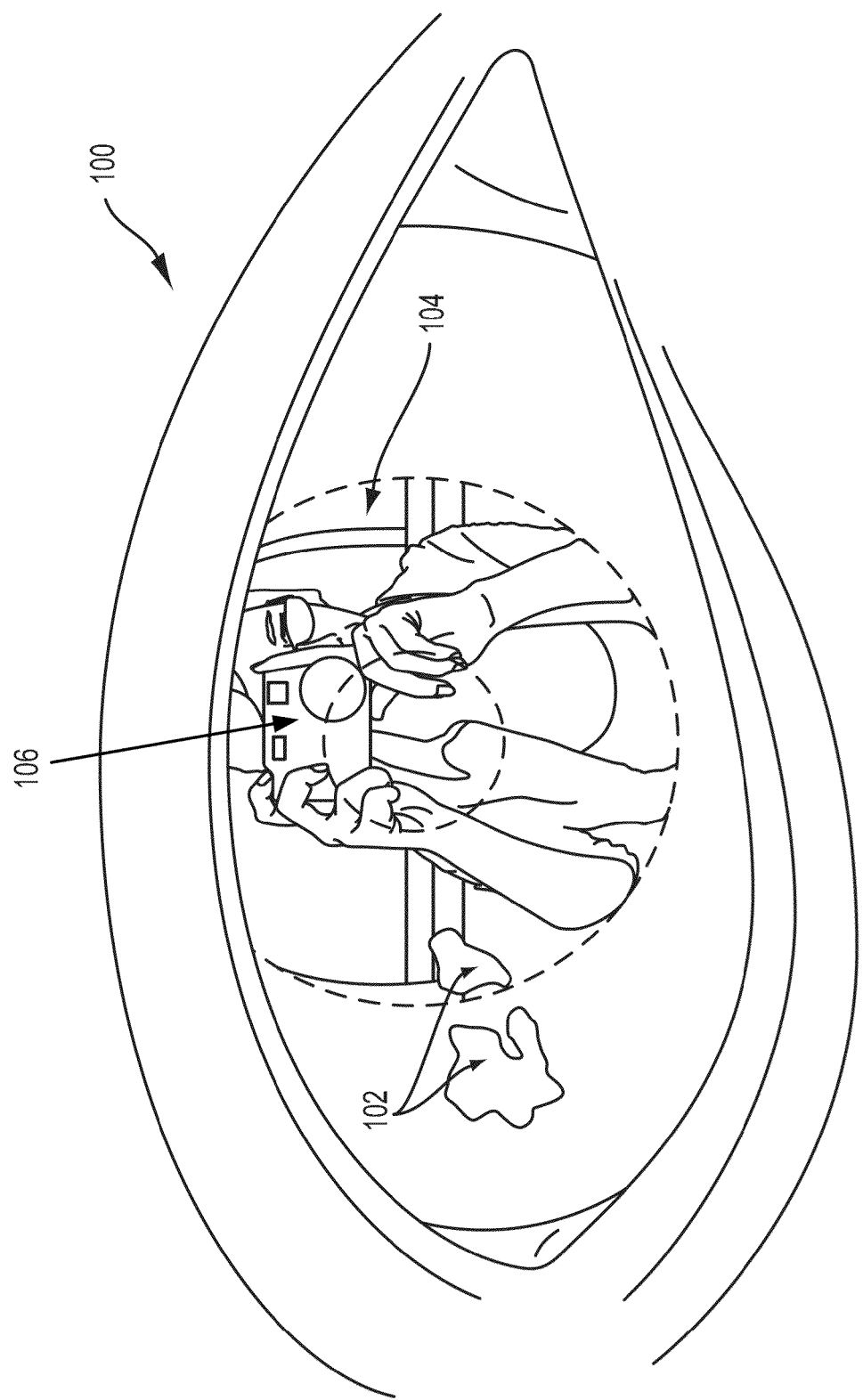
FIG. 1 illustrates reflected features that may be captured in an image of the eye, according to an exemplary embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. OVERVIEW

An exemplary embodiment may be implemented by or take the form of a head-mountable display (HMD), or a computing system that receives data from an HMD, such as a cloud-based server system. The HMD may include an inward-facing camera or cameras that are configured to capture images of the wearer's eye or eyes. The images of the wearer's eye may be video and/or still images, depending upon the particular implementation. Further, the cornea and/or the sclera may reflect light from the wearer's eye. Such reflections may therefore be captured in images of the wearer's eye. Since the eye typically reflects an image of what the wearer is viewing, reflections captured in images of the eye may be indicative of what the wearer is looking at.

Typically, when an HMD is worn, the image reflected from the wearer's eye (referred to herein as a "reflected image" or simply a "reflection") may change as the eye moves in space. In particular, due to the shape of the eye, reflected features may warp and or move on the surface of the eye as the eye moves. Such changes to the reflected image may generally be referred to as "movement" of the reflected image. As such, the movement of a reflected image between two images can be used to determine how much the eye moved in space. However, the movement of the eye in space occurs when the head moves and when the eye itself moves (e.g., when the eyeball moves in the orbit). Therefore, when there is movement in a reflected image, it may not be readily apparent how much of the movement is due to head movement, and how much results from orbital movement of the eye itself.

Accordingly, exemplary embodiments may help to determine the head-movement component and/or the orbital component that make up the overall movement of the eye in space, based on a corresponding movement of the image reflected from the eye. To do so, an HMD may implement an expectation maximization process where it alternatingly estimates the head-movement component and the orbital component of an observed eye movement until the combination of the estimated head-movement component and the estimated orbital component match, or are acceptably close to, the observed movement of the reflections on the eye.

More specifically, the HMD may use head-movement data provided by accelerometers and/or gyroscopes on the HMD, for example, to determine how the head moved during a given period of time and, correspondingly, how the eye moves in space as a result of this head-movement. This serves as the estimate of the head-movement component of the overall eye movement. Accordingly, the HMD may then calculate how the image reflected from the eye is expected to move based on only the head-movement component of the eye movement, and compare the expected movement to the movement of the reflected image that is actually observed during the period. The difference between the expected and observed movement, if any, may be attributed to the orbital component of the eye movement. As such, the HMD may use the difference in movement to estimate the orbital component of eye movement.

The HMD may then combine the head-movement component and the orbital component to determine an expected overall eye movement, assuming these estimations are correct. The HMD may then test the estimated components by comparing the expected movement of the reflected image, which would occur if the expected eye movement were correct, to the observed movement of the reflected image.

If the difference between the expected and observed movement of the reflected image is deemed significant, then the HMD may adjust assumptions and/or parameters and recursively repeat the process until the difference is less than a threshold. When the difference between the expected movement and the observed movement is less then the threshold, then the HMD may determine eye movement data for the period being evaluated based on the current estimate of the orbital component and/or the current estimate of the head-movement component.

In some cases, the difference between the expected and observed movement may be attributable to inaccurate data from the gyroscope and/or accelerometer. Accordingly, the wearable computer may adjust how data from the gyroscope and/or accelerometer is interpreted. Further, due to variations between wearers, the model of the human body that is applied when determining the amount of eye movement that is attributable to head movement, may also be inaccurate. Similarly, assumptions as to the location of the eye with respect to the gyroscope and/or accelerometer may also lead to inaccuracies. Thus, the wearable computer may additionally or alternatively adjust its model of the human body (e.g., with respect to the head, neck, and/or eye), and/or may adjust its assumption with regards to the location of the eye relative to the sensors in the HMD. In accordance with typical expectation maximization procedure, the adjustments may be gradual.

Note that in an exemplary embodiment, a reflected image may include reflections of various features in a person's environment. The individual features within a reflected image may each be referred to as a "reflected feature." A reflected feature may be a "glint" that results from a light source reflecting from the HMD wearer's eye. Reflected features may also result from sources (e.g., people or objects) that block light sources, and lead to dark areas in a reflected image where glints are obstructed. For example, FIG. 1 illustrates reflected features that may be captured in an image of the eye, according to an exemplary embodiment. In particular, the illustrated image of the eye 100 includes reflected features 102 and 104. Reflected features 102 may include glints that result from a light source reflecting from the surface of the eye 100. Reflected feature 104, on the other hand, is a darker feature that results from its source blocking a light source. Specifically, in the illustrated example, the source of reflected feature 104 is a person who is capturing the image of eye 100.

Further, an object in the wearer's field of view, such as camera 106, may be illuminated such that reflections from the object reflect off the eye and are distinguishable in an image of the eye. Thus, reflected features may include reflections from objects in a user's environment (e.g., people, cars, etc.) or objects that block such reflections from objects. Reflected features may take other forms as well.

FIG. 1 illustrates reflected features that may be captured in an image of the eye, according to an exemplary embodiment. In particular, the illustrated image of the eye 100 includes reflected features 102 and 104. Reflected features 102 are glints, which result from a light source reflecting from the surface of the eye 100. Reflected feature 104, on the other hand, is a darker feature that results from its source blocking a light source. Specifically, in the illustrated example, the source of reflected feature 104 is a person who is capturing the image of eye 100. It should be understood that herein, a "reflected image" may be an image of the entire eye, an image of an entire portion of the eye image (e.g., the corneal surface), or may be a set of one or more reflected features that collectively define the reflected image.

II. EYE-TRACKING METHODS BASED ON AMBIENT GLINTS

Figure 2:
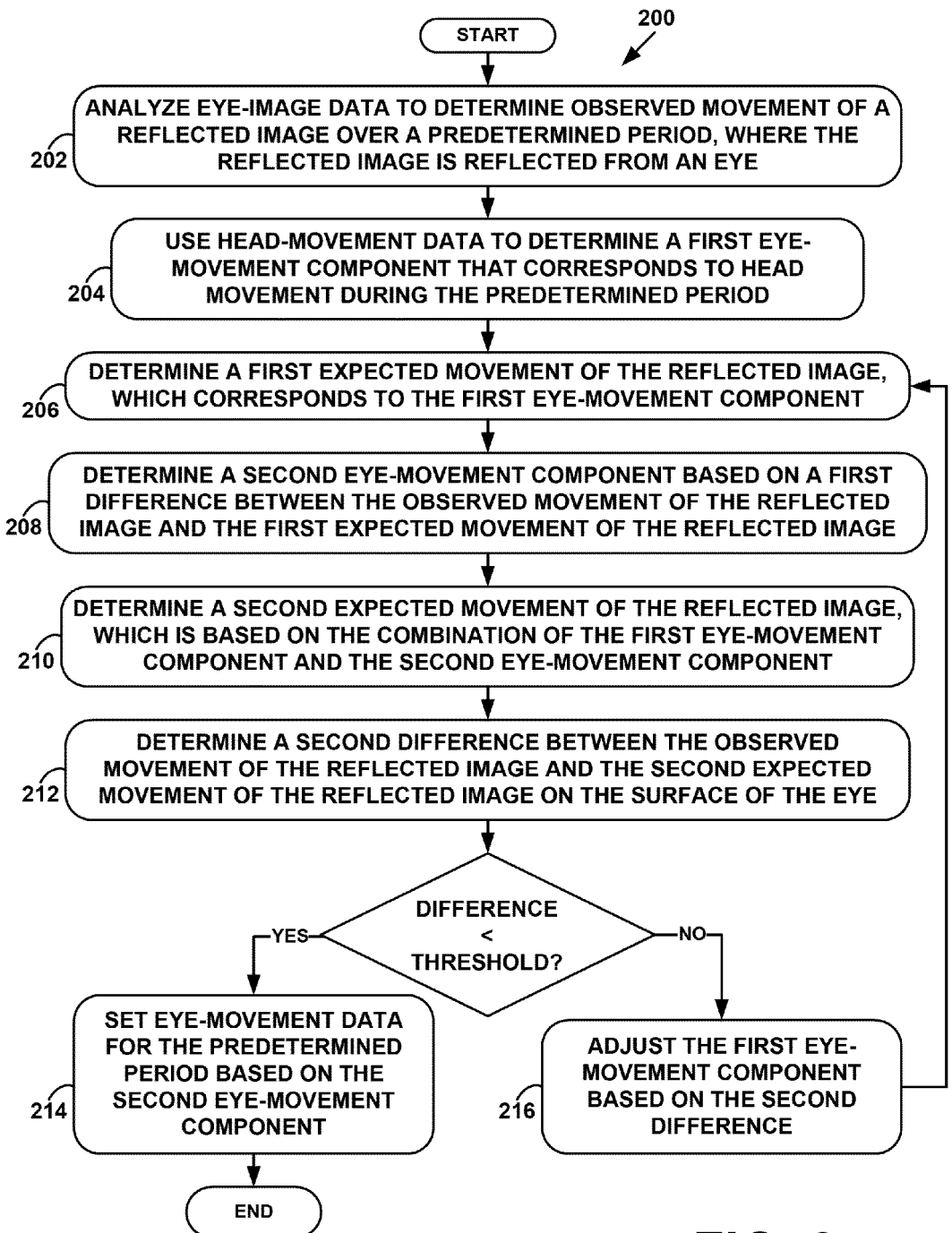
FIG. 2 is a flow chart illustrating a method, according to an exemplary embodiment.

FIG. 2 is a flow chart illustrating a method 200, according to an exemplary embodiment. Exemplary methods, such as method 200, may be carried out in whole or in part by a wearable computer having a head-mountable display (which may further have an inward-facing camera, depending upon the particular implementation). For simplicity, a wearable computer configured as such may simply be referred to as a "head-mountable display" or "HMD" herein.

Accordingly, exemplary methods may be described by way of example herein as being implemented by an HMD. However, it should be understood that an exemplary method may be implemented in whole or in part by other types of computing devices. For example, an exemplary method may be implemented in whole or in part by a server system, which receives data from a device such as an HMD. As further examples, an exemplary method may be implemented in whole or in part by a mobile phone, tablet computer, or laptop computer equipped with a camera, by a network-enabled camera, and/or by other computing devices configured to capture and/or receive eye-image data. Other examples of computing devices or combinations of computing devices that can implement an exemplary method are possible.

As shown by block 202 of FIG. 2, exemplary method 200 involves an HMD analyzing eye-image data to determine observed movement of a reflected image over a predetermined period, where the reflected image is reflected from an eye, as shown by block 202. The HMD may then use head-movement data to determine a first eye-movement component that corresponds to head movement during the predetermined period, as shown by block 204. The HMD may then determine a first expected movement of the reflected image, which corresponds to the first eye-movement component, as shown by block 206. The HMD may also determine a second eye-movement component based on a first difference between the observed movement of the reflected image and the first expected movement of the reflected image, as shown by block 208.

Further, the HMD may determine a second expected movement of the reflected image, which is based on the combination of the first eye-movement component and the second eye-movement component, as shown by block 210. The HMD may then determine a second difference between the observed movement of the reflected image and the second expected movement of the reflected image on the surface of the eye, as shown by block 212. If the second difference is less than a threshold difference, then the HMD may set eye-movement data for the predetermined period based on the second eye-movement component, as shown by block 214. On the other hand, if the second difference is greater than the threshold difference, then the HMD adjusts the first eye-movement component based on the second difference, as shown by block 216. The HMD may then repeat blocks 206 to 216 recursively until the difference determined at block 212 is less than the threshold, at which point the HMD sets eye-movement data for the predetermined period based on the second eye-movement component, as shown by block 214.

A. Eye-Image Data

In an exemplary embodiment, the eye-image data may take various forms, and may be captured by and/or received from various devices. In some implementations, eye-image data may take the form of two or more still photographs of an eye (or a portion of the eye, such as the cornea or the iris). In other implementations, eye-image data may take the form of video of an eye. In such an implementation, two or more frames from the video may be analyzed to determine eye movement during between the two frames.

Further, images of the eye (e.g., either still images or frames from a video) may be processed so as to isolate the cornea. In this case, the eye-image data may be two or more images of the surface of the cornea, and thus may provide the corneal field-of-view (FOV) at the time when each such image is captured. Other forms of eye-image data are also possible.

B. Reflected Images

As noted above, a reflected image may take various forms. For instance, as further noted above, a reflected image may be defined be a set of one or more reflected features within an image of the eye. For example, as illustrated by reflected features 102 of FIG. 1, a reflected feature may be a glint. Herein, a glint should generally be understood to be reflected light from the surface of the eye (e.g., a reflection off the cornea and/or sclera). Additionally, a reflected feature may be a reflection from a single light source or a reflection that combines light from two or more light sources.

Further, various types of glints exist. For example, a glint may be "controlled," which means that the glint is a reflection of light from a light source that is located at a known location. However, a glint may also be "uncontrolled" or "ambient," which means that the glint is a reflection of light from a light source at an unknown location. (Note that the terms "uncontrolled glint" and "ambient glint" are used interchangeably herein.)

Reflected features 102 in FIG. 1 are examples of ambient glints, for which the distance to the source is unknown. Note that any reflection from a light source at an unknown location may be considered an ambient glint, even if the light source itself is not an ambient light source (i.e., a light source outputting light that effects everything in the person's environment equally). As such, an ambient glint may in fact be a reflection of a point light source such as a street light, a desk lamp, or a nearby computer screen, among others.

Note that because the source of a controlled glint is known, it may be an unnecessary exercise to perform an exemplary method to determine the z-distance to the source of a controlled glint. However, this should not be interpreted to limit an exemplary method to implementations involving uncontrolled or ambient glints. In many implementations, an exemplary method may be applied equally for controlled and uncontrolled glints.

As further noted above, a reflected feature may also be a darker feature that is defined by edges where the feature blocks out glints, such as reflected feature 104 shown in FIG. 1. Such a reflected feature may be defined by a number of glints, each of which has a portion blocked out by the source object. Alternatively, such a reflected feature may result from a source object blocking out a portion of a single light source.

More generally, a reflected feature may be any aspect of a person's environment that is discernible from an image capturing reflections from the person's eye. Such a reflected feature may be identified by, for example, detecting the contrast at the edge between the feature and other reflected areas or features in the image of the eye, or by using other techniques.

C. Head-Movement Data

In an exemplary embodiment, head-movement data may be received from one or more sensors of an HMD. For example, a typical HMD might include one or more accelerometers and one or more gyroscopes. Other sensors are possible as well. For instance, sensors could also include a camera, a shock sensor, one or more magnetometers, an impact sensor, a contact sensor (e.g., capacitive sensing device), a location determination device (e.g., a GPS device), and/or an orientation sensor (e.g., a theodolite), among others.

In a further aspect, it should be understood that head-movement data may be derived from raw data produced by sensors on an HMD (e.g., raw data from accelerometers and/or gyroscopes). In particular, raw data from motion sensors such as accelerometers and gyroscopes is indicative of how the sensors themselves are moving. Therefore, if the sensors are attached to an HMD, the data indicates how the HMD is moving. Accordingly, movement of the head may be derived by applying a model that describes the spatial relationship between the sensors on an HMD and axes of rotation for the head.

Further, while gyroscopes are generally accurate in practice, they measure velocity, not position. As such, data from a gyroscope may be integrated in order to determine the degrees of rotation about each axis. Therefore, to quantify the movements of a gyroscope in 3D space, an HMD may implement various integration/estimation techniques that are well known in the art. Further, since accelerometers measure acceleration, and not position, a double integration may be performed on the data from an accelerometer to estimate of the movement of the accelerometer in space (as compared to velocity data a gyroscope, for which a single integration may provide an estimate of movement). The movement of the sensor(s) (e.g., the gyroscope(s) and/or accelerometer(s)) may then be mapped to corresponding movement of the eye, and in some embodiments, to corresponding movement of the cornea in particular.

In an exemplary embodiment, head movement can typically be modeled as occurring around a pivot point in the neck. (See e.g., Henry Dreyfuss Associates, *The Measure of Man & Woman*, p. 16.) Further, gyroscope(s) and/or accelerometer(s) can be mounted in a manner such that the spatial relationship of a sensor to the axes of head movement can be modeled. For example, a motion sensor could be mounted a front corner of an HMD, such that a distance to the center of rotation along the axis from the back of the head to the eyes can be modeled, and such that a distance from the center of rotation along the axis defined by the left and right eye. Further, the distances from the center of the eyeball to the center of rotation along both of the above axes may be fixed with respect to the sensor, such that the motion of the center of the eyeball can be modeled.

More specifically, since the eyeball may be modeled by an average diameter (e.g., 24 mm), this means that the cornea may be modeled as being half of the diameter (e.g., 12 mm) in front of the center of the eyeball. Given this, the motion of the corneal surface due purely to head rotation (e.g., the head-movement component of eye movement) can be calculated based on the head-movement data from the sensors.

D. Eye Movements

Sources of the reflected features that are captured in the reflected image will in most cases move in a manner that is uncorrelated to a person's head movement. Therefore, when the head moves, this typically changes the position of the eyes relative to the sources of the reflected features. As a result, movement of the image reflected from the corneal surface may occur due to both head movement and movement of the eyeball itself (e.g., movement of the eye within the orbit caused by muscular control of the eye).

Herein, movement of the eye in space that occurs as a result of head movement may be referred to as the head-movement component of eye movement. Further, movement of the eye within the orbit may be referred to herein as the orbital component of eye movement. Yet further, the movement of an eye in space due to the combination of the head-movement component and the orbital component of eye movement may be referred to herein as the total or overall eye movement.

E. Determining the Observed Movement of Reflected Image

In some embodiments, the observed movement of the reflected image may simply be indicated by an image that captures the state of the reflected image at the end of the time period for which eye movement is being determined. In such an embodiment, the observed movement may be determined by receiving, identifying, and/or processing an image reflected from the eye, which was captured at or near the end of the period.

In other embodiments, the observed movement of a reflected image may be determined by analyzing, e.g., two images of the cornea that are captured at different times. For example, movement of the reflected image on the corneal surface may be observed via a sequence of two or more corneal images. To do so, a computing system may unwarp (e.g., flatten) two or more corneal images. The computing system may then determine a feature map and/or generate a feature map of reflected features in the reflected image, which indicates the movement of the reflected image between the two corneal images.

Figure 3:
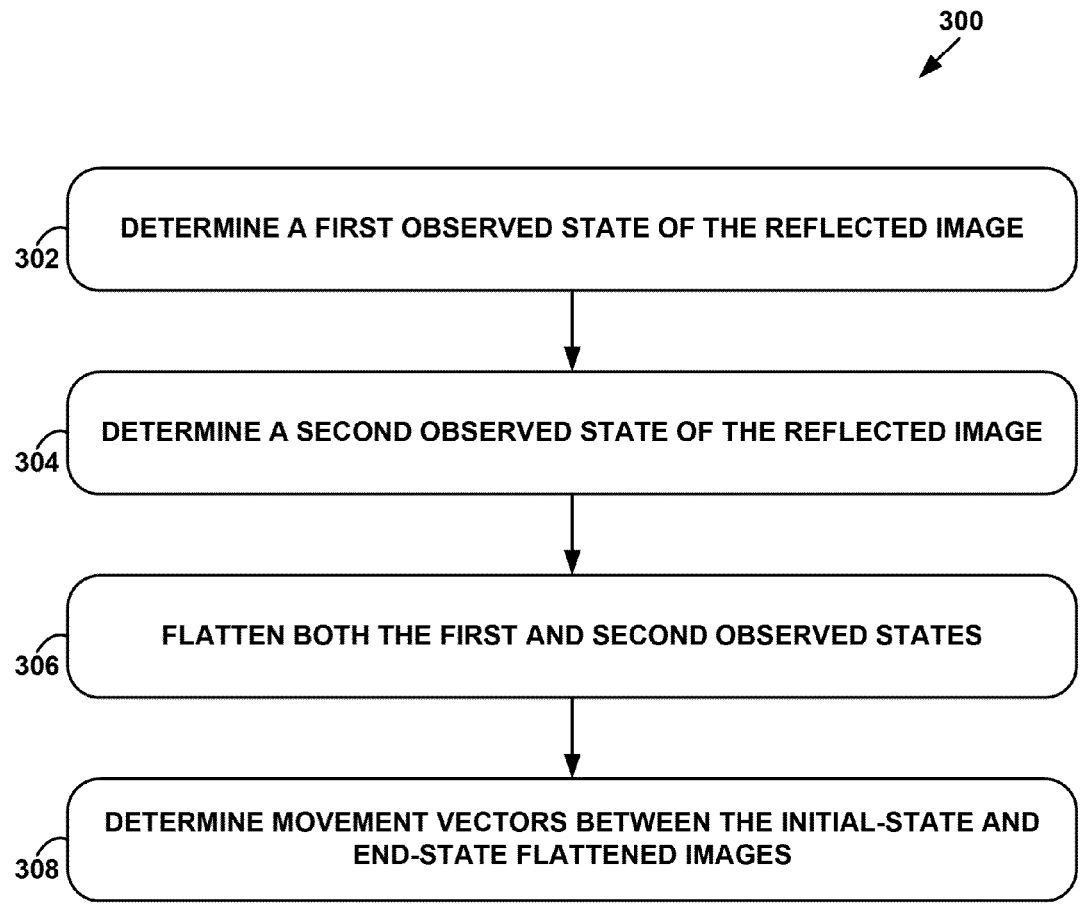
FIG. 3 is a flow chart illustrating a method for determining the observed movement of a reflected image, according to an exemplary embodiment.

FIG. 3 is a flow chart illustrating a method 300 for determining the observed movement of a reflected image, according to an exemplary embodiment. More specifically, to determine the observed movement of the reflected image during a given period of time, an HMD may determine a first observed state of the reflected image, as shown by block 302. The HMD may then determine a second observed state of the reflected image, as shown by block 304. In an exemplary embodiment, the first and second observed states may be images (e.g., still images or video frames) that are captured at the beginning and end of the period for which eye movement is being determined, respectively.

Figure 4A:
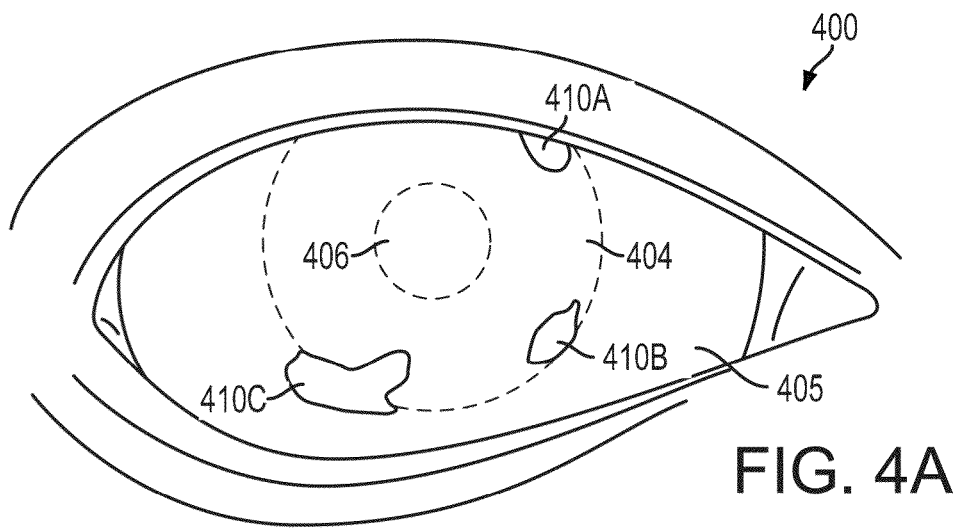
FIGS. 4A and 4B illustrate corneal images captured at the beginning and end of a time period during which eye movement is being evaluated, according to an exemplary embodiment.
Figure 4B:
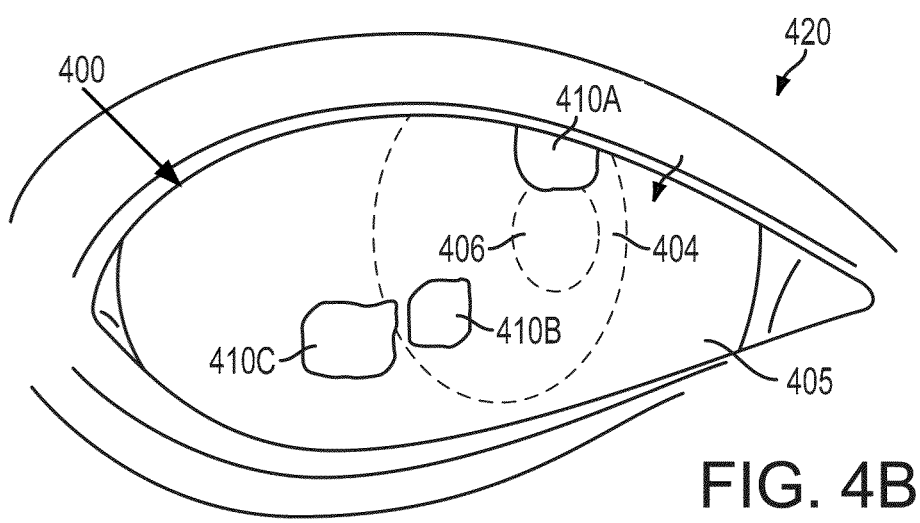

As such, the HMD may then flatten both the first and second observed states, as shown by block 306. For example, FIGS. 4A and 4B illustrate corneal images captured at the beginning and end of a time period during which eye movement is being evaluated, according to an exemplary embodiment. The corneal images 400 and 420 shown in FIGS. 4A and 4B, respectively, may be captured at blocks 302 and 304 of the method 300 shown in FIG. 3.

Figure 5A:
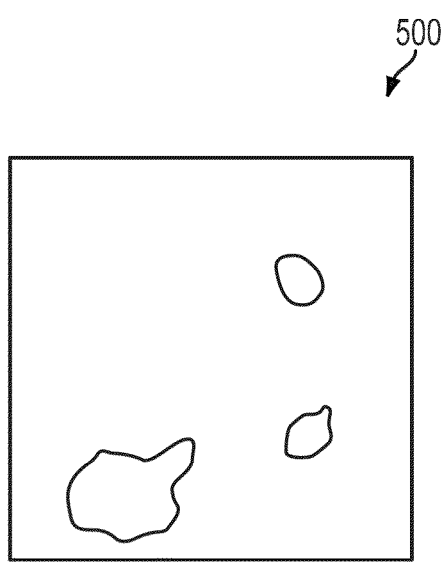
FIGS. 5A and 5B are illustrations of flattened images of the eye, according to an exemplary embodiment.
Figure 5B:
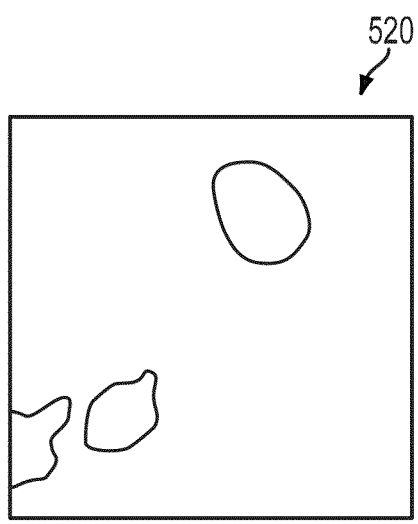

Thus, corneal images 400 and 420 may represent the first and the second observed states of the reflected image, respectively. For example, FIGS. 5A and 5B are illustrations of flattened images of the eye, according to an exemplary embodiment. In particular, FIG. 5A shows a flattened image 500 that may be generated by flattening image 400, while FIG. 5B shows a flattened image 520 that may be generated by flattening image 420.

Figure 6A:
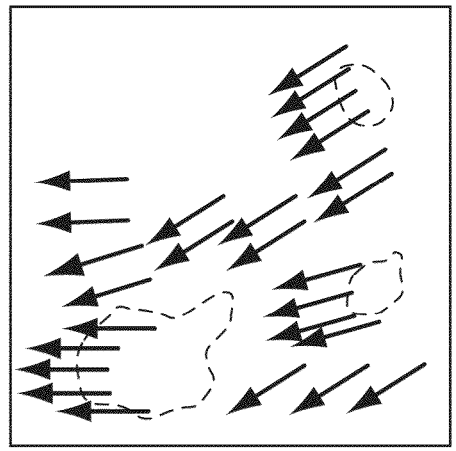
FIG. 6A is an illustration of an optical flow, according to an exemplary embodiment.

The HMD may then measure the observed movement of the reflected image by determining movement vectors between the initial-state and end-state flattened images, as shown by block 308. To do so, once the initial observed state 400 and the ending observed state 420 are flattened, an HMD may generate an optical flow and/or a feature-mapping between the flattened images. More specifically, the HMD may determine the optical flow between flattened image 500 and flattened image 520. FIG. 6A is an illustration of an optical flow, according to an exemplary embodiment. In particular, FIG. 6A shows an optical flow 600 between flattened image 500 and flattened image 520. The optical flow 600 between the first and second state of the reflected image may thus provide a measure of the observed movement of the reflected image.

Figure 6B:
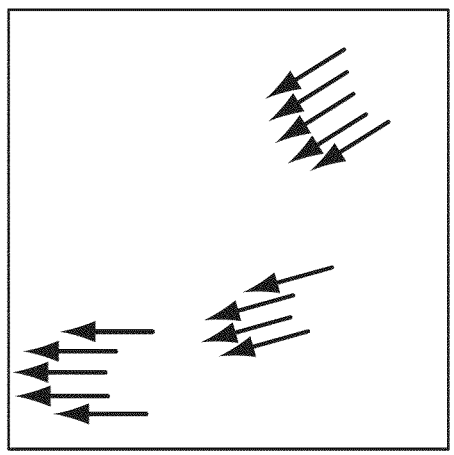
FIG. 6B is an illustration of a feature map, according to an exemplary embodiment.

Additionally or alternatively, once the optical flow 600A between flattened image 500 and flattened image 520 is determined, the HMD may generate a feature map by isolating the optical flow of certain reflected features in the reflected image. For example, FIG. 6B is an illustration of a feature map, according to an exemplary embodiment. In particular, FIG. 6B shows a feature map 602 that is based on optical flow 600. Feature map 602 thus includes the optical flow from the areas of reflected image 302A where reflected features 410A, 410B, and 410C are located, but has substantially removed optical flow vectors from the remaining areas of the feature map. In an exemplary embodiment, this feature map may serve as a measure of the observed movement of the reflected features 410A, 410B, and 410C (and thus of the reflected image).

F. Determining an Eye-Movement Component Resulting from Head Movement

As shown in FIG. 2, at block 204 of method 200, the HMD may determine a first eye-movement component that corresponds to the head movement during the period for which eye movement is being determined. More specifically, in an exemplary embodiment, the first eye-movement component may be the head-movement component of the total eye movement. Accordingly, to determine the first eye-movement component, the HMD may acquire and/or process data from sensors indicating movement that correlates to head movement, such as accelerometers and gyroscopes that are attached to or included as part of an HMD. The HMD may thus derive an estimated amount of eye movement that corresponds to the amount of movement experienced by the sensors.

Further, while gyroscopes are typically accurate, they measure velocity and not position. As such, head-movement data from a gyroscope may be integrated in order to determine the degrees of rotation about each axis. Therefore, to quantify the movements of a gyroscope in 3D space, an HMD may implement various integration/estimation techniques that are well known in the art. The movement of the sensor may then be mapped to corresponding movement of the eye, and in some embodiments, to corresponding movement of the cornea in particular.

In an exemplary embodiment, head movement can typically be modeled as occurring around a pivot point in the neck. (See e.g. Henry Dreyfuss Associates, *The Measure of Man & Woman*, p. 16.) Further, gyroscope(s) and/or accelerometer(s) can be mounted in a manner such that the spatial relationship of a sensor to the axes of head movement can be modeled. For example, a motion sensor could be mounted a front corner of an HMD, such that a distance to the center of rotation along the axis from the back of the head to the eyes can be modeled, and such that a distance from the center of rotation along the axis defined by the left and right eye. Further, the distances from the center of the eyeball to the center of rotation along both of the above axes may be fixed with respect to the sensor, such that the motion of the center of the eyeball can be modeled.

More specifically, since the eyeball may be modeled by an average diameter (e.g., 24 mm), this means that the cornea may be modeled as being half of the diameter (e.g., 12 mm) in front of the center of the eyeball. Given this, the motion of the corneal surface due purely to head rotation (e.g., the head-movement component of eye movement) can be calculated based on the head-movement data from the sensors.

Note that in some embodiments, determining the eye movement resulting from head movement may involve using sensor data from an HMD to determine movement of the sensors, then determining the head movement that corresponds to the determined movement of the sensors, and then determining the amount of eye movement that corresponds to the determined amount of head movement. Alternatively, a combination transform could be used, which takes sensor data from sensors on the HMD, and directly determines the amount of eye movement corresponding to head movement based on the sensor data. This transform may be derived by multiplying a matrix that transforms the movement of the HMD to corresponding movement of the head by a matrix that transforms movement of the head to corresponding movement of the eye. In a further aspect of such an embodiment using a combination transform, the HMD may assume that (a) the spatial relationship between the HMD and head is not changing substantially and that the relationship between the head and (b) the eye stays in substantially the same position relative to the head.

G. Determining an Expected Movement of the Reflected Image that Corresponds to First Eye-Movement Component Once the eye movement resulting from head movement has been determined, an HMD may determine the expected movement of the reflected image. In an exemplary embodiment, the expected movement is the movement that would occur if there were no orbital component to eye movement, and all eye movement during the period resulted from head movement.

In some embodiments, the expected movement of the reflected image may be indicated by the state of the reflected image at the end of the time period for which eye movement is being determined. In such an embodiment, the expected movement may be determined by generating an image that is indicative of what the reflected image would look like after just the head-movement component of eye movement. In an exemplary embodiment, this may be accomplished extracting a portion of a spherical panorama of a person's environment that corresponds to the position the eye would be in after just the head-movement component of eye movement.

Figure 7:
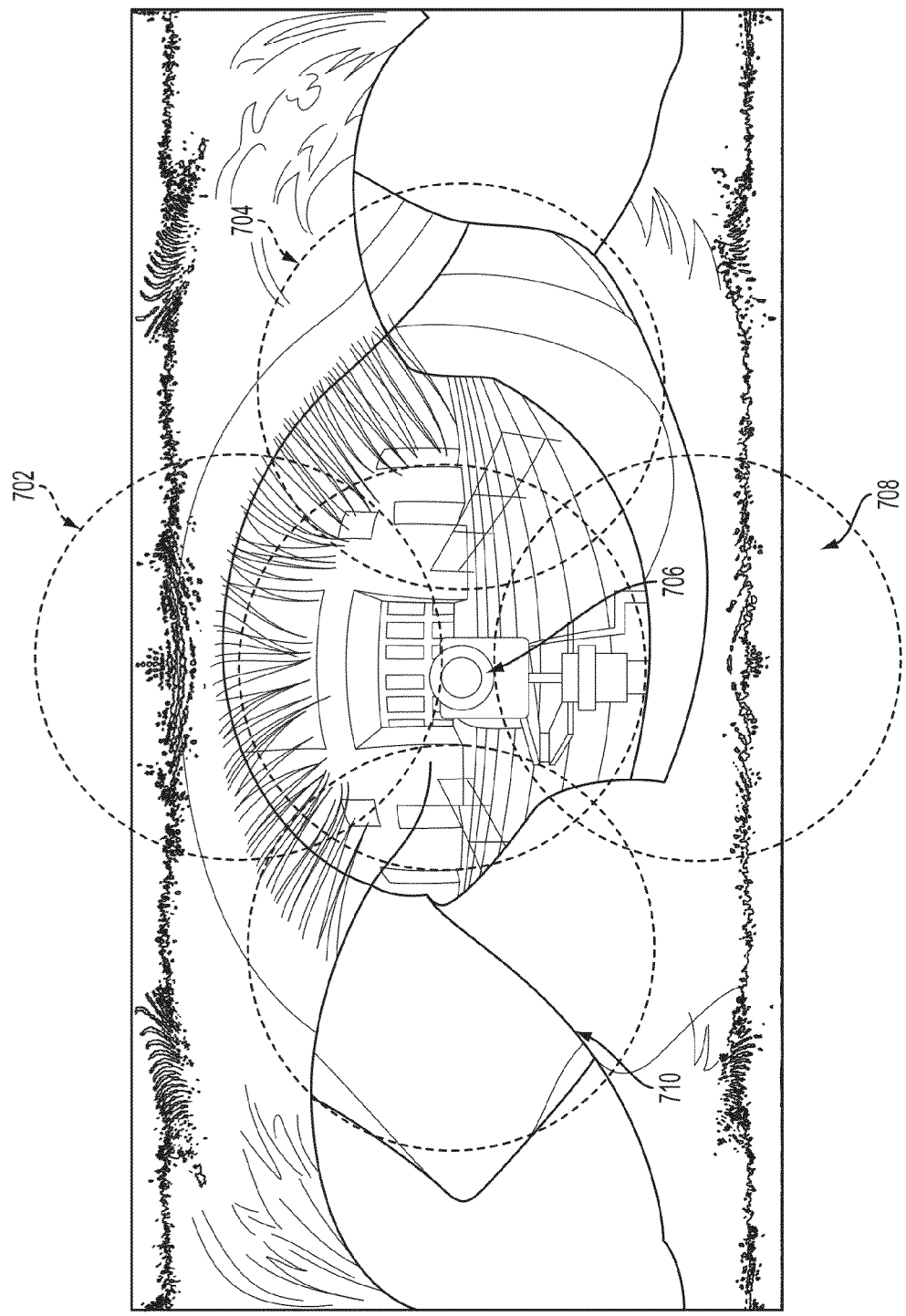
FIG. 7 is an illustration of a spherical panorama, according to an exemplary embodiment.

More specifically, FIG. 7 is an illustration of a spherical panorama 700, according to an exemplary embodiment. In particular, spherical panorama 700 is a multi-image spherical panorama, which may have been generated by registering and merging a number of single-image panoramas in a manner described in Nishino, K. and Nayar, S. K., "Extraction of Visual Information from Images of Eyes" in: Hammoud, R. I. (Ed.), Passive Eye Monitoring: Algorithms, Applications, and Experiments (2008 Springer-Verlag Berlin Heidelberg), pp. 170-173. Further, in the process of creating a spherical panorama, the HMD may also build a mapping of eye position to the corresponding portions the spherical panorama.

Figure 8A:
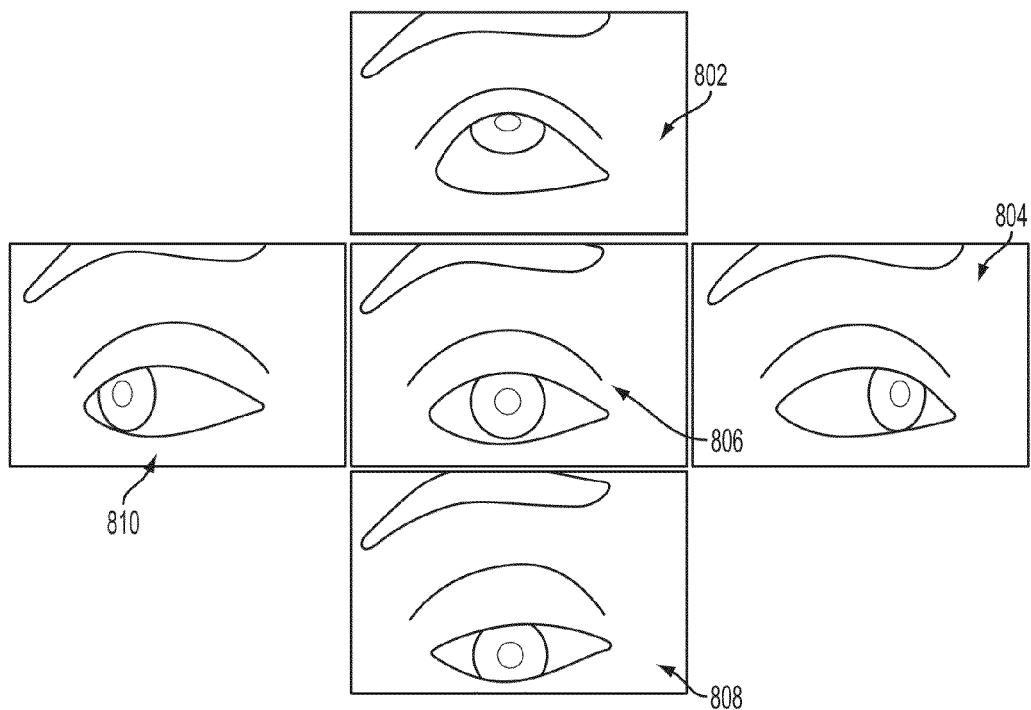
FIG. 8A is an illustration of a number of eye positions, according to an exemplary embodiment.
Figure 8B:
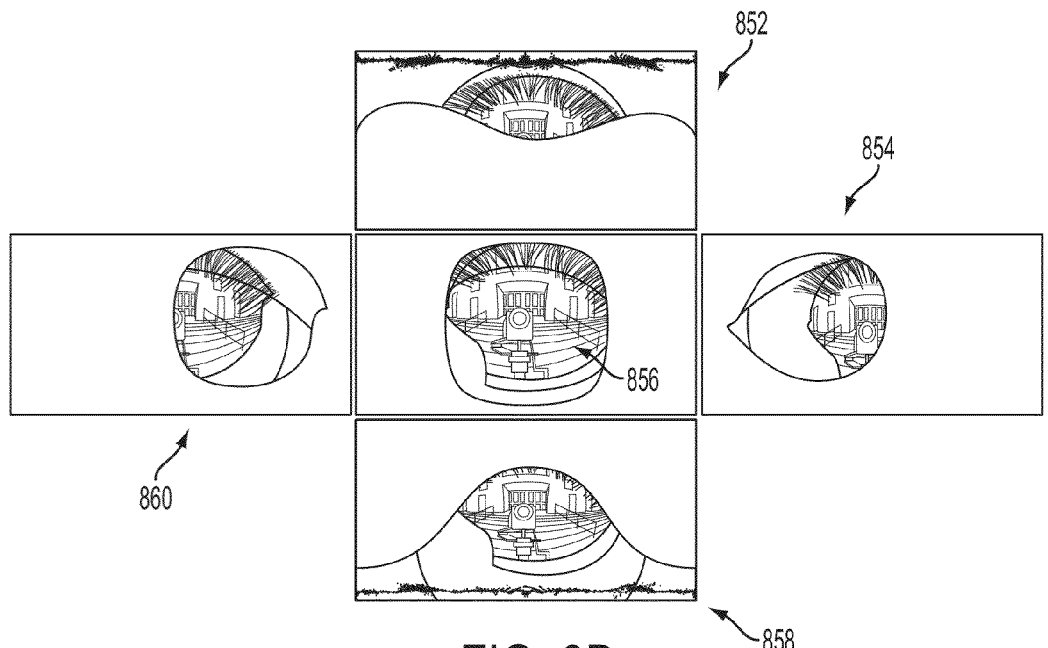
FIG. 8B is an illustration of reflected images corresponding to the eye positions shown in FIG. 8A, according to an exemplary embodiment.

For example, FIG. 8A is an illustration of a number of eye positions, according to an exemplary embodiment. Further, FIG. 8B is an illustration of reflected images corresponding to the eye positions shown in FIG. 8A, according to an exemplary embodiment. In particular, reflected image 852 illustrates the image reflected from the cornea when the eye is in position 802, reflected image 854 illustrates the image reflected from the cornea when the eye is in position 804, reflected image 856 illustrates the image reflected from the cornea when the eye is in position 806, reflected image 858 illustrates the image reflected from the cornea when the eye is in position 808, and reflected image 860 illustrates the image reflected from the cornea when the eye is in position 810. Further, as shown in FIG. 8B, reflected images 852 to 860 may match up with areas 702 to 710, respectively, on spherical panorama 700 of FIG. 7.

As such, a spherical panorama 700 may provide an environmental map that can be used to generate an expected end state of the reflected image if the only movement of the eye were due to head movement. To do so, the HMD may first determine the initial observed state of the reflected image. The HMD may then determine the area in the spherical panorama that corresponds to the initial observed state of the reflected image. As such, the HMD can use an ellipsoidal model of the eye to determine the expected position of the eye, assuming that the eye starts at the initial eye position and undergoes only the head-movement component of eye movement. The expected position of the eye may then be mapped to the spherical panorama 700 to determine how the reflected image is expected to look after only the head-movement component of eye movement.

For example, consider a scenario where the initially observed state of the eye is represented by reflected image 854. In this scenario, the HMD may match the reflected image to area 804 on spherical panorama 700. Then, based on the predetermined mapping of eye position to locations in spherical panorama 700, the HMD may determine that the expected end state of the reflected image is represented by area 706 in spherical panorama 700 (e.g., the end state corresponding to a movement from eye position 804 to eye position 806). Accordingly, area 706 may be defined as the expected end state of the reflected image, and thus may serve as an indication of the movement during the period for which the eye movement is being determined.

Additionally or alternatively, optical-flow and/or feature mapping techniques may be used to determine the expected movement of the reflected image. For example, the HMD may determine an optical flow and/or a feature map of the reflected features that corresponds to movement from the initially observed state of the reflected features to a state that is expected based on the head-movement component of eye movement and the respective distances to reflected features in a reflected image. In some implementations, this may involve the HMD calculating movement vectors on the 3D ellipsoidal model of the eye, which correspond to the eye movement resulting from head movement, and then flattening the movement vectors. In other implementations, this may involve the HMD flattening the initial image of the eye, and then determine the optical flow from the flattened image, and then mapping the optical flow back to the 3D ellipsoidal model in order to determine the expected end state of the reflected image,]

H. Determining the Second Eye-Movement Component

In an exemplary embodiment, the second-eye movement component may be a measure of the orbital eye movement; or in other words, movement of the eye relative to the orbit (i.e., the "eye socket"), which is caused by the muscles controlling the eye. Thus, the combination of the second eye-movement component, which indicates how much the eye has moved within the orbit, and the first eye-movement component, which indicates how much the eye has moved due to head movement, may indicate the overall movement of the eye in space. (Note that determining of the orbital eye movement may be the general purpose of an exemplary method.)

Figure 8C:
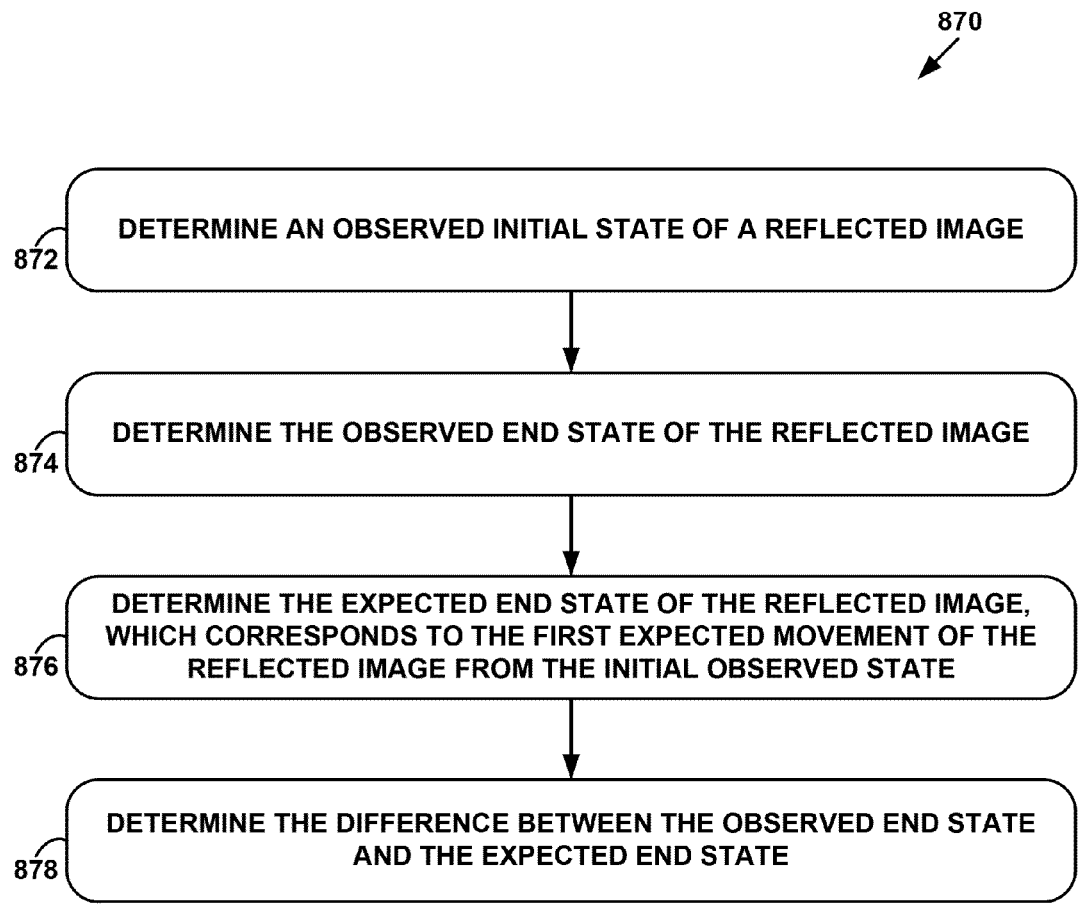
FIG. 8C is a flow chart illustrating a method for determining the second eye-movement component, according to an exemplary embodiment.

In order to estimate the orbital eye movement, an HMD may compare the observed state and the expected state at the end of the predetermined period. More specifically, FIG. 8C is a flow chart illustrating a method 870 for determining the second eye-movement component, according to an exemplary embodiment.

As shown by block 872, method 870 involves the HMD determining an observed initial state of a reflected image (e.g., the observed state at the start of the predetermined period). The HMD then determines the observed end state of the reflected image (e.g., the observed state at the end of the predetermined period), as shown by block 874. Further, the HMD determines an indication of the expected eye-movement, given that the only eye movement results from head movement. They HMD may do so by determining the expected end state of the reflected image, which corresponds to the first expected movement of the reflected image from the initial observed state, as shown by block 876. The HMD then determines the difference between the observed state and the expected state at the end of the predetermined period, as shown by block 878.

In an exemplary embodiment, the orbital eye movement may be assumed to be the reason for this difference. Therefore, the amount of eye-movement that accounts for the difference between the observed end state and the expected end state of the reflected image may serve as an estimate of the orbital eye movement. Thus, in an exemplary embodiment, the second eye-movement component may be an estimate of orbital eye movement that is determined using a technique such as that illustrated by method 870.

For example, referring back to FIGS. 7, 8A, and 8B, consider the scenario described above where the expected end state of the reflected image is reflected image 856, which corresponds to area 706 in panorama 700. If the observed end state of the reflected image is reflected image 860, for example, then the estimated orbital eye movement is the eye movement that accounts for the difference between the observed and expected, assuming that the head-movement component of eye movement has been correctly determined. For instance, given if reflected image 860 is the observed end state and reflected image 856 is the expected end state, then the estimated orbital eye movement corresponds to a movement from eye position 806 to eye position 810 (e.g., between area 706 and area 710 in panorama 700).

Optical flow and/or feature mapping may also be used here to determine the orbital component of eye movement. For example, the HMD may start with the expected end state of the reflected image after head movement and the observed end state, which may take the form of images that are represented on the ellipsoidal surface of the cornea. As such, the HMD may flatten the expected end state image and the observed end state image, and determine optical flow and/or perform feature mapping between the flattened images. This optical flow may serve as the estimation of the orbital eye movement. Additionally or alternatively, the optical flow and/or feature map may be mapped back to the 3D ellipsoidal model of the corneal surface. Doing so may provide an estimation of the orbital eye movement on the corneal surface and/or provide an indication of the ending position of the eye.

I. Determining the Expected Movement of the Reflected Image Corresponding to the Combination of the First and Second Eye-Movement Components After estimating the head-movement component (e.g., the first eye-movement component) and orbital component (e.g., the second eye-movement component) of the overall eye movement, the HMD may determine a second expected movement of the reflected image, which, in an exemplary embodiment, corresponds to the combination of head-movement component of eye movement and the orbital eye-movement estimate. More specifically, the head-movement component of eye movement and the orbital eye-movement estimate may be combined to estimate an overall eye movement in space. The HMD may then calculate the expected movement of the reflected image, assuming the overall eye movement is correct.

In an exemplary embodiment, the expected movement of the reflected image that corresponds to the overall eye movement may be determined using similar techniques to those used when determining the expected movement of the reflected image based on only the head-movement component. However, other techniques may be utilized without departing from the scope of the invention.

Here, optical flow and/or image mapping may be used in a similar manner as described above with respect to determining the expected movement of the reflected image based on only head movement, except that here, the expected movement may account for the head-movement component and the orbital component of eye movement.

J. Determine a Difference between the Observed Movement and the Second Expected Movement of the Reflected Image After determining the expected movement of the reflected image that corresponds to the overall eye movement, the HMD may compare the expected movement to the observed movement. To do so, the HMD may utilize similar techniques as when determining the difference between the observed movement and the expected movement based on only the head-movement component of eye movement.

For example, the HMD may again compare the observed state at the end of the predetermined period to the expected state at the end of the period for which eye movement is being determined. In particular, the HMD may compare the reflected image that is observed at the end of the period to an estimate of the reflected image that is generated from the panorama, based on eye undergoing the overall eye movement as determined, from the initially observed state of the reflected image.

At this point, the difference (if any) may be attributed to error in currently determined head-movement component of eye movement. Accordingly, the HMD may make appropriate adjustments, re-determine the head-movement component of eye movement, and repeat the exemplary method.

In a further aspect, optical flow and/or image mapping may be used in a similar manner as described above with respect to determining difference between the expected movement of the reflected image based on only head movement and the observed movement of the reflected image. However, in this case, the difference may be determined between the observed movement and the expected eye movement of the reflected feature that corresponds to the combination of the head-movement component and the orbital component of eye movement.

K. Recursively Adjusting the First Eye-Movement Component to Determine Eye Movement When the orbital eye movement has been correctly determined, the expected movement of the reflected image should be the same as or very close to the observed movement of the reflected image. In other words, the expected end state of the reflected image given the overall eye movement will match or nearly match the observed end state of the reflected image. Thus, determine whether the difference between the observed movement of the reflected image and the expected movement based on the overall eye movement is small enough to conclude that the orbital eye movement estimation can be set as the orbital eye movement for the time period being evaluated.

If the difference is too great (e.g., greater than a threshold difference), then the HMD may make various adjustments to affect the first eye-movement components. In an exemplary embodiment, the adjustments may be determined according to the difference between the observed and expected movement of the reflected image. In particular, the HMD may make adjustments in an effort to reduce the difference between the observed movement of the reflected image and the expected movement of the reflected image (e.g. in an effort to make the expected end state of the reflected image closer to matching the observed end state).

More specifically, if the expected movement the reflected image is greater than the observed movement, this may be interpreted to mean that the head-movement component of eye movement was likely over-estimated. Accordingly, adjustments may be made in an effort to reduce the head-movement component. Similarly, if the expected movement the reflected image is greater than the observed movement, this may be interpreted to mean that the head-movement component of eye movement was likely under-estimated. Accordingly, adjustments may be made in an effort to increase the head-movement component.

Further, the amount by which the adjustments are expected to affect the head-movement component may also be based on the difference between the observed and expected movement of the reflected image. For instance, in an exemplary embodiment, the HMD may make adjustments that are expected to make the observed and expected eye movement closer to one another, but are less than what would cause the expected movement to equal the observed movement. For example, the value of the one or more parameters may be adjusted such that the difference would be expected to decrease by 5% and 10%. Other examples are also possible. By adjusting the parameters gradually, an exemplary method may help to avoid a situation where the adjustment overshoots the required adjustments and potentially prevents successful assessment of eye movement.

In an exemplary embodiment, various adjustments may be made in an effort to increase or decrease the head-movement component of eye movement. For example, the HMD may adjust the manner in which raw movement data from sensors on the HMD is mapped to corresponding movement of the eye. To do so, the HMD may adjust the model of the human body and/or the model of the way the HMD sits in relation to the head when worn. Such an adjustment may involve an adjustment to the spatial relationship between the one or more sensors and the eye, an adjustment to the spatial relationship between the one or more sensors and the axes of head movement, and/or an adjustment to the spatial relationship between the axes of head movement and the eye and re-determining the first expected movement of the reflected image based on the re-determined first eye-movement component.

Once such adjustments are made, the HMD may re-determine the amount of eye movement caused by head movement, and repeat an exemplary method with the re-determined head-movement component. Further, the HMD may recursively repeat this process until the difference between the observed movement of the reflected image and the expected movement based on the overall eye movement is small enough to conclude that the orbital eye movement estimation can be set as the orbital eye movement for the time period being evaluated.

III. PRE-MAPPING REFLECTED FEATURES

As noted, some embodiments may utilize a spherical panorama to provide an environment map against which reflected images can be compared and matched to help determine eye position and/or movement. Accordingly, an exemplary method may further involve an initial process by which such a spherical panorama is created. A spherical panorama of stitched together corneal images may be generated with techniques such as those described in Nishino and Nayar at pp. 170-173.

Note, however, that the process described in Nayar requires the ability to ascertain the cornea in an image of the eye, in order to determine the distance and angle to the sources of reflected features. This may not be feasible when using ambient glints for eye-tracking. Therefore, an exemplary method may utilize different techniques for determining the z-distance to sources of reflected features. In particular, an initial expectation maximization process may be used to determine z-distances to sources of reflected features. An exemplary expectation maximization process for determining z-distance is described in greater detail later herein.

Alternatively, in some embodiments, an initial assumption may be made that all sources of reflected features are effectively at an infinite distance from the eye. As such, an exemplary method may then be carried out based on this assumption, In such an embodiment, the z-distance(s) to source(s) may be included as additional unknown(s) in the expectation maximization process outlined in FIG. 2. Thus, exemplary method 200 may further involve adjusting the estimated z-distances to sources, in addition to adjusting the first eye-movement component, on some or all iterations of method 200.

In a further aspect, an exemplary method may also involve determining the locations of reflected features in the spherical panorama, before performing functions such as those illustrated in method 200 of FIG. 2. For example, to determine the distance from the eye to a reflected feature (referred to herein as the "z-distance"), an expectation maximization process may be performed. In an exemplary embodiment, a wearable computer may initiate the expectation maximization process with the initial assumption that the distance to a reflected feature is infinite and that the head of the wearer is not moving substantially. (Note that the wearable computer may use a gyroscope and/or an accelerometer to verify that the wearer is not moving their head.) With these assumptions, the wearable computer may be configured to determine the z-distance to the source of a reflected feature by comparing an observed movement of the reflected feature on the eye, to an expected movement that is based on an estimated z-distance, and adjusting the estimate of the z-distance until the observed movement of the reflected feature on the eye matches (or differs by less than a certain threshold from) the expected movement.

IV. EXEMPLARY WEARABLE COMPUTING DEVICES

In a further aspect, note that using the expected movements of the reflected features on the eye to determine the corresponding z-distance to the source may involve first using the expected movements of the reflected features on the eye and a model of the eye's shape to determine an estimated movement (e.g., rotation) of the eye. The estimated movement of the eye may then be used to determine the expected movements of the reflected features on the surface of the eye. As such, the wearable computer may iteratively adjust the estimate of the z-distance and re-determine the expected movements of the reflected features on the surface of the eye (the expected movements of the reflected features being derived from a re-estimate of the movement of the eye), Systems and devices in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary, system may also take the form of a device such as a wearable computer or mobile phone, or a subsystem of such a device, which includes such a non-transitory computer readable medium having such program instructions stored thereon.

Figure 9A:
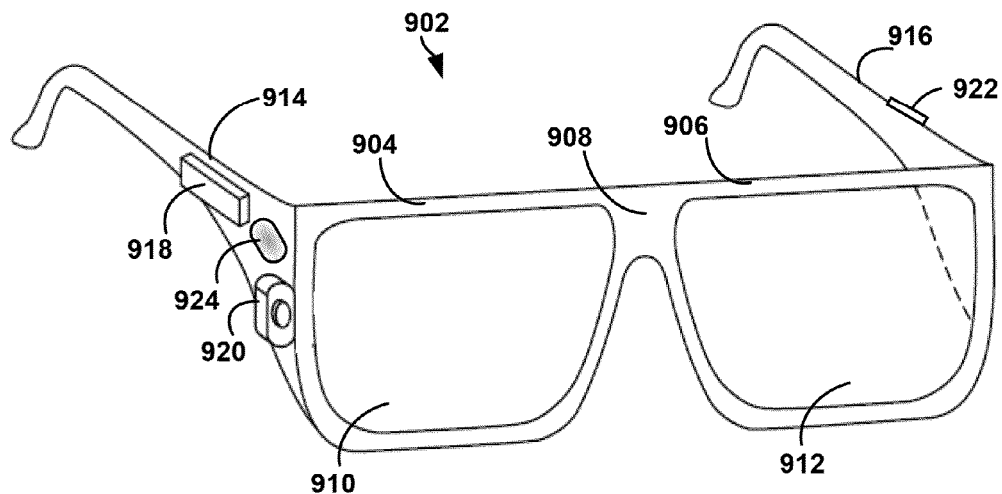
FIG. 9A illustrates a wearable computing system, according to an exemplary embodiment.

FIG. 9A illustrates a wearable computing system according to an exemplary embodiment. In FIG. 9A, the wearable computing system takes the form of a head-mounted device (HMD) 902 (which may also be referred to as a head-mounted display). It should be understood, however, that exemplary systems and devices may take the form of or be implemented within or in association with other types of devices, without departing from the scope of the invention. As illustrated in FIG. 9A, the head-mounted device 902 comprises frame elements including lens-frames 904, 906 and a center frame support 908, lens elements 910, 912, and extending side-arms 914, 916. The center frame support 908 and the extending side-arms 914, 916 are configured to secure the head-mounted device 902 to a user's face via a user's nose and ears, respectively.

Each of the frame elements 904, 906, and 908 and the extending side-arms 914, 916 may be formed of a solid structure of plastic and/or metal, or may be formed of a hollow structure of similar material so as to allow wiring and component interconnects to be internally routed through the head-mounted device 902. Other materials may be possible as well.

One or more of each of the lens elements 910, 912 may be formed of any material that can suitably display a projected image or graphic. Each of the lens elements 910, 912 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 914, 916 may each be projections that extend away from the lens-frames 904, 906, respectively, and may be positioned behind a user's ears to secure the head-mounted device 902 to the user. The extending side-arms 914, 916 may further secure the head-mounted device 902 to the user by extending around a rear portion of the user's head. Additionally or alternatively, for example, the HMD 902 may connect to or be affixed within a head-mounted helmet structure. Other possibilities exist as well.

The HMD 902 may also include an on-board computing system 918, a video camera 920, a sensor 922, and a finger-operable touch pad 924. The on-board computing system 918 is shown to be positioned on the extending side-arm 914 of the head-mounted device 902; however, the on-board computing system 918 may be provided on other parts of the head-mounted device 902 or may be positioned remote from the head-mounted device 902 (e.g., the on-board computing system 918 could be wire- or wirelessly-connected to the head-mounted device 902). The on-board computing system 918 may include a processor and memory, for example. The on-board computing system 918 may be configured to receive and analyze data from the video camera 920 and the finger-operable touch pad 924 (and possibly from other sensory devices, user interfaces, or both) and generate images for output by the lens elements 910 and 912.

The video camera 920 is shown positioned on the extending side-arm 914 of the head-mounted device 902; however, the video camera 920 may be provided on other parts of the head-mounted device 902. The video camera 920 may be configured to capture images at various resolutions or at different frame rates. Many video cameras with a small form-factor, such as those used in cell phones or webcams, for example, may be incorporated into an example of the HMD 902.

Further, although FIG. 9A illustrates one video camera 920, more video cameras may be used, and each may be configured to capture the same view, or to capture different views. For example, the video camera 920 may be forward facing to capture at least a portion of the real-world view perceived by the user. This forward facing image captured by the video camera 920 may then be used to generate an augmented reality where computer generated images appear to interact with the real-world view perceived by the user.

The sensor 922 is shown on the extending side-arm 916 of the head-mounted device 902; however, the sensor 922 may be positioned on other parts of the head-mounted device 902. The sensor 922 may include one or more of a gyroscope or an accelerometer, for example. Other sensing devices may be included within, or in addition to, the sensor 922 or other sensing functions may be performed by the sensor 922.

The finger-operable touch pad 924 is shown on the extending side-arm 914 of the head-mounted device 902. However, the finger-operable touch pad 924 may be positioned on other parts of the head-mounted device 902. Also, more than one finger-operable touch pad may be present on the head-mounted device 902. The finger-operable touch pad 924 may be used by a user to input commands. The finger-operable touch pad 924 may sense at least one of a position and a movement of a finger via capacitive sensing, resistance sensing, or a surface acoustic wave process, among other possibilities. The finger-operable touch pad 924 may be capable of sensing finger movement in a direction parallel or planar to the pad surface, in a direction normal to the pad surface, or both, and may also be capable of sensing a level of pressure applied to the pad surface. The finger-operable touch pad 924 may be formed of one or more translucent or transparent insulating layers and one or more translucent or transparent conducting layers. Edges of the finger-operable touch pad 924 may be formed to have a raised, indented, or roughened surface, so as to provide tactile feedback to a user when the user's finger reaches the edge, or other area, of the finger-operable touch pad 924. If more than one finger-operable touch pad is present, each finger-operable touch pad may be operated independently, and may provide a different function.

Figure 9B:
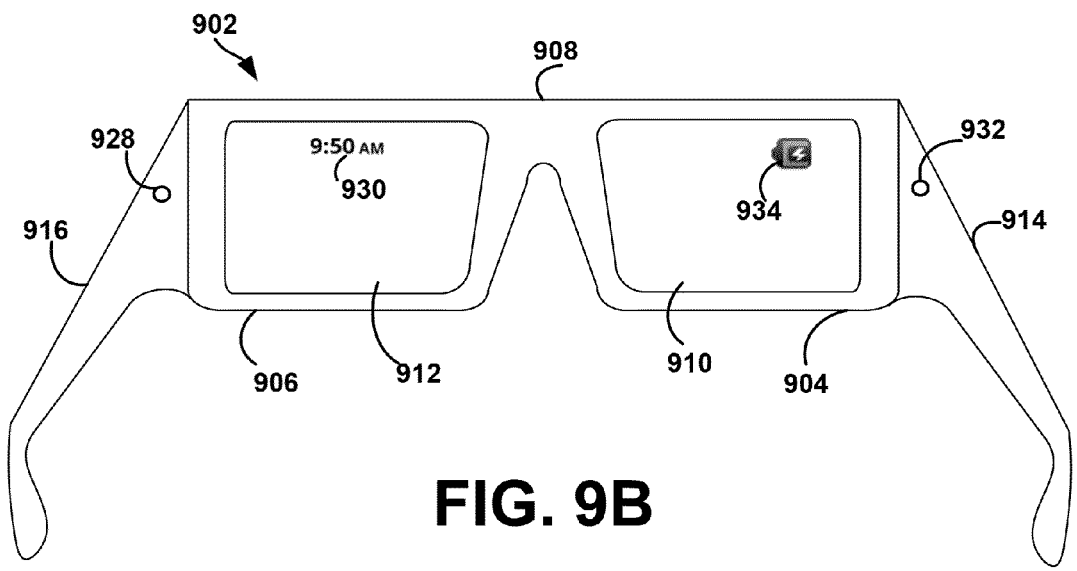
FIG. 9B illustrates an alternate view of the wearable computing device illustrated in FIG. 9A, according to an exemplary embodiment.

FIG. 9B illustrates an alternate view of the wearable computing device illustrated in FIG. 9A. As shown in FIG. 9B, the lens elements 910, 912 may act as display elements. The head-mounted device 902 may include a first projector 928 coupled to an inside surface of the extending side-arm 916 and configured to project a display 930 onto an inside surface of the lens element 912. Additionally or alternatively, a second projector 932 may be coupled to an inside surface of the extending side-arm 914 and configured to project a display 934 onto an inside surface of the lens element 910.

The lens elements 910, 912 may act as a combiner in a light projection system and may include a coating that reflects the light projected onto them from the projectors 928, 932. In some embodiments, a reflective coating may not be used (e.g., when the projectors 928, 932 are scanning laser devices).

In alternative embodiments, other types of display elements may also be used. For example, the lens elements 910, 912 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 904, 906 for driving such a matrix display. Alternatively or additionally, a laser or LED source and scanning system could be used to draw a raster display directly onto the retina of one or more of the user's eyes. Other possibilities exist as well.

FIG. 9C illustrates another wearable computing system according to an exemplary embodiment, which takes the form of an HMD 952. The HMD 952 may include frame elements and side-arms such as those described with respect to FIGS. 9A and 9B. The HMD 952 may additionally include an on-board computing system 954 and a video camera 206, such as those described with respect to FIGS. 9A and 9B. The video camera 206 is shown mounted on a frame of the HMD 952. However, the video camera 206 may be mounted at other positions as well.

As shown in FIG. 9C, the HMD 952 may include a single display 958 which may be coupled to the device. The display 958 may be formed on one of the lens elements of the HMD 952, such as a lens element described with respect to FIGS. 9A and 9B, and may be configured to overlay computer-generated graphics in the user's view of the physical world. The display 958 is shown to be provided in a center of a lens of the HMD 952, however, the display 958 may be provided in other positions. The display 958 is controllable via the computing system 954 that is coupled to the display 958 via an optical waveguide 960.

FIG. 9D illustrates another wearable computing system according to an exemplary embodiment, which takes the form of an HMD 972. The HMD 972 may include side-arms 973, a center frame support 974, and a bridge portion with nosepiece 975. In the example shown in FIG. 9D, the center frame support 974 connects the side-arms 973. The HMD 972 does not include lens-frames containing lens elements. The HMD 972 may additionally include an on-board computing system 976 and a video camera 978, such as those described with respect to FIGS. 9A and 9B.

The HMD 972 may include a single lens element 980 that may be coupled to one of the side-arms 973 or the center frame support 974. The lens element 980 may include a display such as the display described with reference to FIGS. 9A and 9B, and may be configured to overlay computer-generated graphics upon the user's view of the physical world. In one example, the single lens element 980 may be coupled to the inner side (i.e., the side exposed to a portion of a user's head when worn by the user) of the extending side-arm 973. The single lens element 980 may be positioned in front of or proximate to a user's eye when the HMD 972 is worn by a user. For example, the single lens element 980 may be positioned below the center frame support 974, as shown in FIG. 9D.

Figure 10:
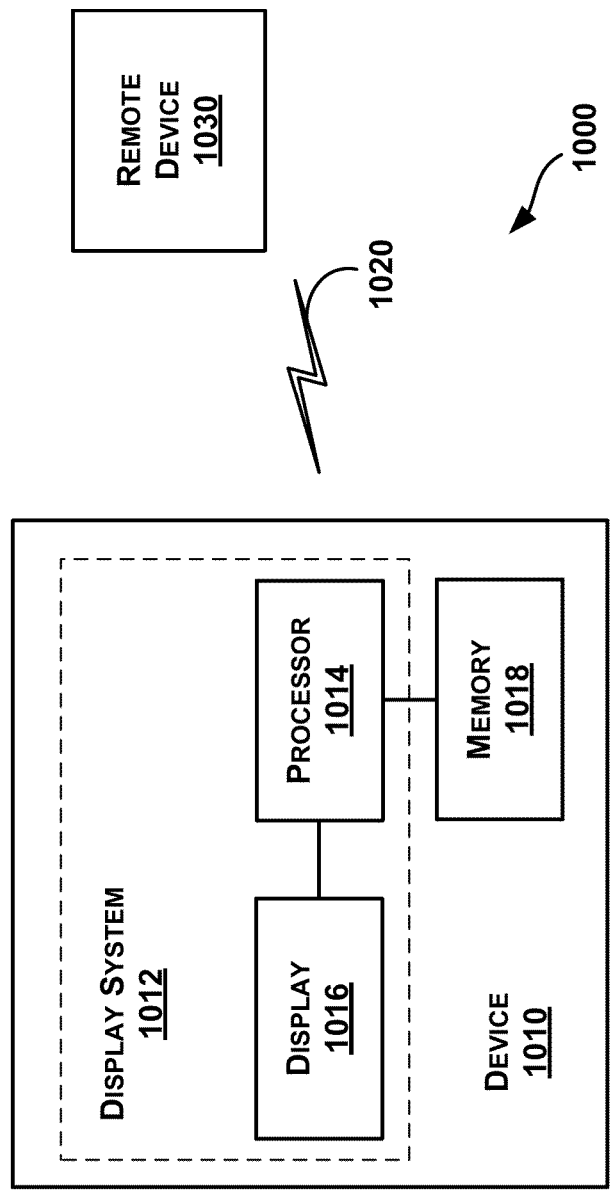
FIG. 10 illustrates a schematic drawing of a computing device, according to an exemplary embodiment.

FIG. 10 illustrates a schematic drawing of a computing device according to an exemplary embodiment. In system 1000, a device 1010 communicates using a communication link 1020 (e.g., a wired or wireless connection) to a remote device 1030. The device 1010 may be any type of device that can receive data and display information corresponding to or associated with the data. For example, the device 1010 may be a heads-up display system, such as the head-mounted devices 902, 952, or 972 described with reference to FIGS. 9A-9D.

Thus, the device 1010 may include a display system 1012 comprising a processor 1014 and a display 1016. The display 1010 may be, for example, an optical see-through display, an optical see-around display, or a video see-through display. The processor 1014 may receive data from the remote device 1030, and configure the data for display on the display 1016. The processor 1014 may be any type of processor, such as a micro-processor or a digital signal processor, for example.

The device 1010 may further include on-board data storage, such as memory 1018 coupled to the processor 1014. The memory 1018 may store software that can be accessed and executed by the processor 1014, for example.

The remote device 1030 may be any type of computing device or transmitter including a laptop computer, a mobile telephone, or tablet computing device, etc., that is configured to transmit data to the device 1010. The remote device 1030 and the device 1010 may contain hardware to enable the communication link 1020, such as processors, transmitters, receivers, antennas, etc.

In FIG. 10, the communication link 1020 is illustrated as a wireless connection; however, wired connections may also be used. For example, the communication link 1020 may be a wired serial bus such as a universal serial bus or a parallel bus. A wired connection may be a proprietary connection as well. The communication link 1020 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 1030 may be accessible via the Internet and may include a computing cluster associated with a particular web service (e.g., social-networking, photo sharing, address book, etc.).

V. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A computer-implemented method comprising:
   (a) analyzing eye-image data to determine observed movement of a reflected image over a predetermined period, wherein the reflected image is reflected from an eye;
   (b) using head-movement data to determine a first eye-movement component that corresponds to head movement during the predetermined period;
   (c) determining a first expected movement of the reflected image, wherein the first expected movement corresponds to the first eye-movement component;
   (d) determining a second eye-movement component based on a first difference between the observed movement of the reflected image and the first expected movement of the reflected image;
   (e) determining a second expected movement of the reflected image based on the combination of the first eye-movement component and the second eye-movement component;
   (f) determining a second difference between the observed movement of the reflected image on the corneal surface and the second expected movement of the reflected image;
   (g) if the second difference is less than a threshold difference, then setting eye-movement data for the predetermined period based on the second eye-movement component; and
   (h) if the second difference is greater than the threshold difference, then:
      (i) adjusting the first eye-movement component based on the second difference; and
      (ii) repeating (d) to (h) with the adjusted first eye-movement component.

2. The method of claim 1, wherein the eye-image data is captured by an inward-facing camera on a head-mountable display.

3. The method of claim 1, wherein analyzing eye-image data to determine observed movement of a reflected image over the predetermined period comprises determining a second state of the reflected image at the end of the predetermined period.

4. The method of claim 1, wherein the head-movement data comprises data from one or more sensors on a head-mountable display.

5. The method of claim 3, wherein the one or more sensors comprise at least one of: (i) one or more accelerometers, (ii) one or more gyroscopes, and (iii) one or more magnetometers.

6. The method of claim 3, wherein using the head-movement data to determine the first eye-movement component comprises:
   using the head-movement data to determine the head movement during the predetermined period; and
   using a spatial relationship between axes of head movement and the eye as a basis for determining an eye movement that corresponds to the head movement during the predetermined period.

7. The method of claim 3, wherein using the head-movement data to determine the first eye-movement component comprises:
   using the head-movement data to determine the head movement during the predetermined period; and
   using at least one of: (i) an estimated spatial relationship between the one or more sensors and axes for head movement and (ii) an estimated spatial relationship between the one or more sensors and the eye, as a basis for determining an eye movement that corresponds to the head movement during the predetermined period.

8. The method of claim 1, wherein using the head-movement data to determine a first eye-movement component that corresponds to head movement during the predetermined period comprises:

determining a rotational portion of the first eye-movement component; and determining a translational portion of the first eye-movement component.

9. The method of claim 8, wherein determining the translational portion of the first eye-movement component comprises performing an integration process based on the head-movement data to determine a translational eye movement.

10. The method of claim 1, wherein determining a second eye-movement component based on a first difference between the observed movement of the reflected image and the first expected movement of the reflected image comprises:

determining the first difference between the observed movement of the reflected image and the first expected movement of the reflected image.

11. The method of claim 10, wherein determining the first difference between the observed movement of the reflected image and the first expected movement of the reflected image comprises:

determining an observed state of the reflected image at the end of the predetermined period;

determining an expected state of the reflected image at the end of the predetermined period, wherein the expected state corresponds to the first expected movement of the reflected image; and determining a difference between the observed state and the expected state at the end of the predetermined period.

12. The method of claim 11, wherein determining the expected state of the reflected image at the end of the predetermined period comprises:

determining an observed state of the reflected image at the start of the predetermined period; and determining a state of the reflected image after the first expected movement of the reflected image from the observed state at the start of the predetermined period.

13. The method of claim 1, wherein determining a second expected movement of the reflected image based on the combination of the first eye-movement component and the second eye-movement component comprises:

determining an eye-movement estimation indicating the eye movement that would result from the determined head movement and the second eye-movement component; and determining the second expected movement of the reflected image based on the eye-movement estimation.

14. The method of claim 1, wherein determining the second difference between the observed movement of the reflected image on the corneal surface and the second expected movement of the reflected image comprises:

determining an observed state of the reflected image at the end of the predetermined period;

determining an expected state of the reflected image at the end of the predetermined period, wherein the expected state corresponds to the second expected movement of the reflected image; and determining a difference between the observed state and the expected state at the end of the predetermined period.

15. The method of claim 9, wherein determining the expected state of the reflected image at the end of the predetermined period comprises:

determining an observed state of the reflected image at the start of the predetermined period; and determining a state of the reflected image after the second expected movement of the reflected image from the observed state at the start of the predetermined period.

16. The method of claim 1, wherein adjusting the first eye-movement component based on the second difference comprises:

adjusting the head-movement data based on the second difference;

using the adjusted head-movement data to re-determine the first eye-movement component; and re-determining the first expected movement of the reflected image based on the re-determined first eye-movement component.

17. The method of claim 1, wherein the head-movement data comprises data from one or more sensors, wherein a spatial relationship between the one or more sensors and the eye is also used to determine the first eye-movement component, and wherein adjusting the first eye-movement component based on the second difference comprises:

adjusting the spatial relationship between the one or more sensors and the eye;

using the head-movement data and the adjusted spatial relationship to re-determine the first eye-movement component; and re-determining the first expected movement of the reflected image based on the re-determined first eye-movement component.

18. The method of claim 1, wherein the head-movement data comprises data from one or more sensors, wherein a spatial relationship between the one or more sensors and axes of head movement is also used to determine the first eye-movement component, and wherein adjusting the first eye-movement component based on the second difference comprises:

adjusting the spatial relationship between the one or more sensors and the axes of head movement;

using the head-movement data and the adjusted spatial relationship to re-determine the first eye-movement component; and re-determining the first expected movement of the reflected image based on the re-determined first eye-movement component.

19. The method of claim 1, wherein a spatial relationship between axes for head movement and the eye is also used to determine the first eye-movement component, and wherein adjusting the first eye-movement component based on the second difference comprises:

adjusting the spatial relationship between the axes of head movement and the eye;

using the head-movement data and the adjusted spatial relationship to re-determine the first eye-movement component; and re-determining the first expected movement of the reflected image based on the re-determined first eye-movement component.

20. A system comprising:

a non-transitory computer-readable medium; and program instructions stored on the non-transitory computer-readable medium and executable by at least one processor to:

(a) analyze eye-image data to determine observed movement of a reflected image over a predetermined period, wherein the reflected image is reflected from an eye;

(b) use head-movement data to determine a first eye-movement component that corresponds to head movement during the predetermined period;

(c) determine a first expected movement of the reflected image, wherein the first expected movement corresponds to the first eye-movement component;

(d) determine a second eye-movement component based on a first difference between the observed movement of the reflected image and the first expected movement of the reflected image;
(e) determine a second expected movement of the reflected image based on the combination of the first eye-movement component and the second eye-movement component;
(f) determine a second difference between the observed movement of the reflected image on the corneal surface and the second expected movement of the reflected image;
(g) if the second difference is less than a threshold difference, then set eye-movement data for the predetermined period based on the second eye-movement component; and
(h) if the second difference is greater than the threshold difference, then:
 (i) adjust the first eye-movement component based on the second difference; and
 (ii) repeat (d) to (h) with the adjusted first eye-movement component.

\* \* \* \* \*